(12) United States Patent
Balakrishnan et al.

(10) Patent No.: US 7,420,734 B2
(45) Date of Patent: Sep. 2, 2008

(54) PLANAR WAVEGUIDE GRATING DEVICES HAVING CONTROLLED POLARIZATION DEPENDENT SENSITIVITY AND METHOD OF MANUFACTURING THEREOF

(75) Inventors: Ashok Balakrishnan, Kanata (CA); Kokou Dossou, Newton (AU); Muthukumaran Packirisamy, Dorvai (CA)

(73) Assignee: Valorbec Societe En Commandite, Montreal, Quebec (CA)

( * ) Notice: Subject to any disclaimer, the term of this patent is extended or adjusted under 35 U.S.C. 154(b) by 157 days.

(21) Appl. No.: 10/526,096

(22) PCT Filed: Aug. 26, 2003

(86) PCT No.: PCT/CA03/01300
§ 371 (c)(1),
(2), (4) Date: Sep. 14, 2005

(87) PCT Pub. No.: WO2004/019083
PCT Pub. Date: Mar. 4, 2004

(65) Prior Publication Data
US 2006/0119945 A1    Jun. 8, 2006

Related U.S. Application Data

(60) Provisional application No. 60/405,730, filed on Aug. 26, 2002.

(51) Int. Cl.
*G02B 5/18* (2006.01)
(52) U.S. Cl. ........................... 359/569; 359/571
(58) Field of Classification Search .............. 359/566, 359/569, 571, 572, 576
See application file for complete search history.

(56) References Cited

U.S. PATENT DOCUMENTS

| | | | |
|---|---|---|---|
| 6,400,509 B1 | 6/2002 | Sappey et al. | |
| 6,822,796 B2* | 11/2004 | Takada et al. | 359/569 |
| 6,859,317 B1* | 2/2005 | Cappiello et al. | 359/569 |
| 2006/0209411 A1* | 9/2006 | Delage et al. | 359/566 |

OTHER PUBLICATIONS

Loewen, et al.; Diffraction Gratings and Applications, Marcel Dekker, Inc, 1997, pp. 191-232.
Chowdhury; Design of Low-Loss and Polarization-Insensitive Reflection Grating-Based Planar Demultiplexers; IEEE Journal of Selected Topics in Quantum Electronics, vol. 6, No. 2, Mar./Apr. 2000, pp. 233-239.
Neviere, et al.; Perfect Blazing for Transmission Gratings, Journal Opt. Soc. Am. A, vol. 7, No. 9, Sep. 1990, pp. 1736-1739.

* cited by examiner

*Primary Examiner*—Alessandro Amari
(74) *Attorney, Agent, or Firm*—Senniger Powers LLP

(57) ABSTRACT

Diffraction gratings are formed from grooves each having a reflective facet and a non-reflective facet. The net reflection of TE (Transverse Electric) and TM (Transverse Magnetic) polarizations from the grating structure is traded off against the polarization dependent reflection, by controlling the degree of metallization of the reflective facet and by ensuring that there is no metallization of non-reflective sidewalls. other diffraction gratings are manufactured from trenches etched perpendicular to a waveguide. The trenches are metallized and back-filled with a filling material having a refractive index matched to that of the waveguide. The gratings essentially have no non-reflecting sidewalls with insignificant polarization influence from side walls.

19 Claims, 18 Drawing Sheets

PLANAR WAVEGUIDE GRATING DEVICES HAVING CONTROLLED POLARIZATION DEPENDENT SENSITIVITY AND METHOD OF MANUFACTURING THEREOF

CROSS-REFERENCE TO RELATED APPLICATIONS

The present application is based on and claims the benefit of International (PCT) Application Serial No. PCT/CA03/001300, filed on Aug. 26, 2003, which claims priority from U.S. Provisional Patent Application Ser. No. 60/405,730, filed on Aug. 26, 2002. The entire contents of each of these applications is incorporated herein by reference.

FIELD OF THE INVENTION

The invention relates to diffraction gratings with metallized facets.

BACKGROUND OF THE INVENTION

In diffraction gratings such as Echelle gratings having metallized facets with both non-reflective facets and reflective facets being metallized, the diffraction efficiency can be substantially different for light polarized parallel to the edges of the facet versus perpendicular to the edges of the facet. In planar waveguide based diffraction gratings, the gratings are created by etching sidewalls perpendicular to the plane of a waveguiding slab, and the facets are often metallized to create high reflectivity within the slab. In such structures, the presence of metallized sidewalls nearly perpendicular to each reflective facet creates polarization dependence in the diffraction efficiency from the facets. Effectively, the diffraction efficiency of the grating will have a different relationship versus diffracted wavelength for polarizations parallel to the plane of the slab (TE mode) relative to polarizations perpendicular to the plane of the slab (TM mode). This difference in diffraction efficiency with reference to polarization state leads to Polarization Dependent Loss (PDL).

One suggested technique to reduce PDL, which is taught in U.S. Pat. No. 6,400,509, relies on the selective removal of metal from non-reflective facets or preferential metallization of the entire reflective facet.

Assuming that selective removal of metal from non-reflective facets is employed, such techniques are likely to be cumbersome (because selectivity between the reflecting and non-reflective facets is hard to ensure), especially if the grating is concave as in the case of a Rowland circle design. In reality, such techniques may not be able to remove all the metal from the non-reflective facets leading to non-uniform metal coverage and hence uncontrolled wavelength dependent PDL (Polarization Dependent Loss) or PDλ (Polarization Dependent wavelength shift). Finally, such techniques cannot leave a predetermined degree of metal coverage on reflective facets.

SUMMARY OF THE INVENTION

According to one broad aspect, the invention provides a diffraction grating. The diffraction grating has a plurality of grooves formed in a substrate. Each groove has a reflective facet having at least one coated region coated with electrically conducting material, at least one uncoated region not coated with electrically conducting material and at least one sidewall joining the adjacent reflective facets. The sidewall is not coated with electrically conducting material.

In some embodiments, in each reflective facet, there is a single coated region and two uncoated regions on either side of the single coated region.

In some embodiments, the reflective coating is aluminum, gold, or silver.

In some embodiments, the grating facets are Echelle or Echelon types.

In some embodiments, the substrate has an optical planar waveguide which consists of at least one layer of high refractive index surrounded on both sides by media of lower refractive index. The plane of the substrate may also be perpendicular to the reflective facet.

According to another broad aspect, the invention provides a method of forming a diffraction grating. The method includes etching perpendicular to an optical waveguiding substrate to define a plurality of grooves each having a reflective facet and a non-reflecting sidewall. A reflective metal is deposited on and in the region of the reflective facets and non-reflecting sidewalls. A lithography technique is applied in order to pattern the metal only on a substantial but incomplete portion of each reflective facet leaving no metal on the sidewalls and no metal on some part of the reflective facets.

In some embodiments, for each facet, the substantial but incomplete portion of the reflective facet is a centralized portion between two portions of the reflective facet which have no metal.

In some embodiments, the lithography technique consists of depositing photoresist on and in the region of the reflective facets and non-reflecting sidewalls. A mask which differentiates between the substantial but incomplete portion of each facet is used for photolithography that leaves reflective metal only on the substantial but incomplete portion of each facet.

In some embodiments, the method where the lithography technique is a form of a "lift-off" technique which includes depositing, patterning, and etching of photoresist in the region of the grating facets, leaving a substantial but incomplete fraction of each reflective facet exposed. Reflective metal is then deposited on the grating structure followed by lift-off of remaining photoresist and the metal attached to it.

In some embodiments, a dry etch is used to remove, metal from the face of the substrate perpendicular to the reflective and non-reflective facets.

According to another broad aspect, the invention provides a diffraction grating comprising a plurality of reflective facets embedded within an optical medium.

In some embodiments, each reflective facet is rendered reflective by a coating of conductive metal.

In some embodiments, the optical medium comprises a plurality of grooves in a substrate with each groove having a surface which serves as a reflective facet and also having a sidewall, with material with a refractive index similar to that of the substrate deposited in spaces adjoining the facets and sidewalls.

In some embodiments, the substrate comprises an optical waveguide which consists of at least one layer of high refractive index surrounded by media of lower refractive index. The plane of the substrate is perpendicular to the reflective facets.

According to another broad aspect, the invention provides a diffraction grating which includes a plurality of grooves in a substrate. Each groove has a surface which serves as a reflective facet, and has effectively no sidewalls between the facets. The sidewalls are rendered effectively invisible by the application of material with a refractive index similar to that of the substrate. The application is in the spaces adjoining both the facets and the sidewalls.

In some embodiments, the reflective facet is rendered reflective by a coating of conductive metal.

In some embodiments, the conductive metal comprises aluminum, gold or silver.

In some embodiments, the reflective facets reflect the totality of light incident to the grating.

In some embodiments, the reflective facets reflect a substantial fraction of incident light, with light allowed to escape around the edges of the reflecting portions.

In some embodiments, the substrate comprises an optical waveguide which consists of at least one layer of high refractive index surrounded by media of lower refractive index, the plane of said substrate perpendicular to the reflective facet.

According to another broad aspect, the invention provides a method of forming a grating. The method includes etching a plurality of trenches perpendicular to an optical waveguiding layer, one face of each trench forming a reflective facet. Reflective metal is deposited at least on and in the region of the reflective facets and a lithography technique is applied in order to pattern the metal only on the reflective facet leaving no metal elsewhere in the trenches. Material is deposited into the trenches with the material having a similar refractive index to that of the optical waveguide.

In some embodiments, the lithography technique consists of depositing photoresist on and in the region of the reflective facets and non-reflecting sidewalls and depositing a mask which defines the substantial but possibly incomplete reflective portion of each facet. A photolithography leaves reflective metal only on the reflective portion of each facet.

In some embodiments, the lithography technique is a form of a "lift-off" technique which includes depositing, patterning, and etching of photoresist in the region of the grating facets, leaving a substantial but incomplete fraction of each reflective facet exposed. Reflective metal is deposited on the grating structure followed by lift-off of remaining photoresist and the metal attached to it.

In some embodiments, a dry etch is employed in order to remove the metal that is on faces perpendicular to the reflective and non-reflective facets.

In some embodiments, the waveguide material is SiO2, Si, Silicon Nitride or other dielectrics or of group III-V materials that is transparent to the wavelength covering from UV to IR range.

In these new diffraction gratings, the net reflection of both polarizations from the grating structure is traded off against the polarization dependent reflection, by controlling the degree of metallization of the reflective facet and by ensuring that there is no metallization of non-reflective sidewalls.

It is noted that directional removal of metal from non-reflecting walls is not required. This eliminates the problem of non-uniform metal coverage on the reflective facets and hence the uncontrolled wavelength dependency of the PDL.

In the embodiment involving trenches which are back-filled after metallization, the grating structure essentially has no non-reflecting sidewall with insignificant polarization influence from a side wall. This permits the creation of grating structures with full metallization of the reflective facets, without the problems that arise from non-reflecting sidewalls.

Advantageously, standard semiconductor wafer processes can be employed to reduce polarization dependent loss in waveguide grating devices with good repeatability and process controllability.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Planar waveguide diffraction gratings with periodic structures have immense potential for applications in many fields including optical telecommunications, medical and pharmaceutical research, astronomy, chemical sensing, biological sciences, environmental sciences etc.

Figure 1A:
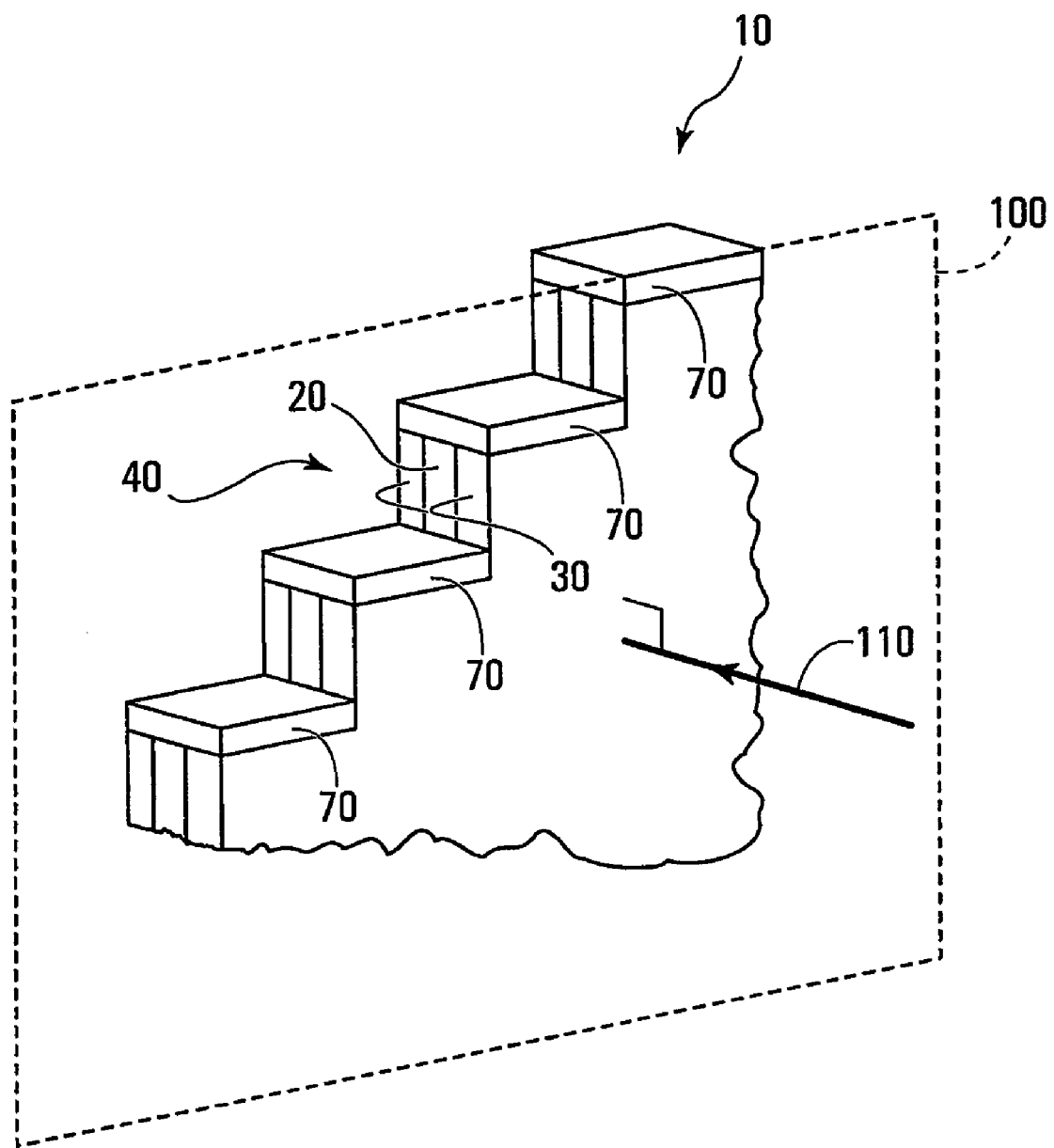
FIG. 1A is a perspective view of a portion of a conventional planar waveguide having an Echelle grating based diffraction grating.

Referring to FIG. 1A, shown is a perspective view of a portion of a conventional planar waveguide having an Echelle grating based diffraction grating. The planar waveguide is generally indicated by 10 and has a high index layer 20 between layers 30 of lower refractive index with indices chosen to guide and transmit light within the high index layer 20. The planar waveguide 10 has an Echelle grating generally indicated by 40. The Echelle grating is clearly shown in FIG. 1B having metallized reflective facets 50 as well as non-reflective facets 60. The metallized reflective facets 50 each have a metallic coating 70. One of the problems with such gratings is reducing Polarization Dependent Loss (PDL) to an acceptable level over a required range of wavelength. It is possible to reduce the PDL only if the polarization dependence of the grating performance is controlled over an operating wavelength range. It is known that the polarization dependence of the grating is dependent on the operating wavelength, grating geometry, corner rounding of the facets, incidence angle etc.

Loewen and Popov in Diffraction Gratings and Applications, Loewen et al., Marcel Dekker Inc., New York, 1997, report polarization dependence of the Echelle grating 40 with both facets 50, 60 being metallized and being dependent on the grating geometry, operating wavelength, grating blaze etc. Chowdhury in Design of low-loss and polarization insensitive reflection grating based planar demultiplexers, Chowdhury, D., IEEE Journal of Selected Topics in Quantum Electronics, vol. 6, Issue 2, 2000, p. 233, reports the influence of grating geometry such as rounding radii of the facets 50, 60 on the polarization dependent behavior. Neviere et al. in Perfect blazing for transmission gratings, Neviere et al., J. Opt. Soc. Am., vol 7, p. 1736, 1990, disclose the influence of metallization of non-reflective facets on the polarization-dependent behavior of the grating 40. The techniques presented within these works result in PDL that is generally not acceptable for industrial standards. U.S. Pat. No. 6,400,509 reports the introduction of a flat in between the reflective facets 50 and the non-reflective facets 60 and also selective etching of metal on the non-reflective facets 60 for the control of the polarization dependence. The problem with this approach is the non-uniformity associated with the selective removal of metal on the non-reflective facets 60 as it is implemented by directional etching. Implementation of this approach for the mass production of planar waveguide based grating devices is cumbersome and laborious. The implementation of this approach for curved gratings becomes complicated due to the directionality of this approach, and shadowing effects which ensue.

A TE (Transverse Electric) polarization of light 80 and a TM (Transverse Magnetic) polarization of light 90 both strike the grating 40 with nearly the same angular content (or equivalently, the same light coverage of the grating 40). However, the TE polarization of light 80 (with its electric field in a plane 100 of the planar waveguide 10) has different boundary conditions than the TM polarization of light 90 at the non-reflective facets 60 (sidewall). The metallic coatings 70 form conducting surfaces and at the conducting surfaces there can be no electric field parallel to these surfaces and the TM polarization of light 90 is affected differently than TE polarization light 80. Even though neither polarizations of light 80, 90 strikes the non-reflective facet 60, the field amplitude and phase profiles will differ for TE and TM polarizations of light 80, 90. This difference can best be calculated according to vector diffraction theory using Finite Element Methods. For such calculations, the grating 40 is considered to be infinitely long and having a uniform grating period. The polarization dependence on wavelength is a broad-scaled variation with respect to diffraction angle from the grating. Such a broad variation is a manifestation of a diffraction envelope from individual facets. Hence, only a single grating period, Λ, is considered for the estimation of grating efficiency.

In being diffracted at the facets 50, the TE and TM polarizations of light 80, 90 satisfy a grating equation given by $$m\lambda = \Lambda(\sin\theta_i + \sin\theta_{d,j})$$

where m is a diffraction order, $\Lambda$ is a grating period, $\lambda$ is an effective wavelength of the TE and TM polarizations of light 80, 90 in the medium in which they propagate, $\theta_i$ is an angle of incidence between the TE and TM polarizations of light 80, 90 and a normal 290 to the facets 50, $\theta_{d,j}$ (j=TM, TE) is an angle of diffraction between a respective one of diffracted TE and TM polarizations of light 85, 95 and the normal 290.

Analysis with Metal on Every Facet

Figure 1B:
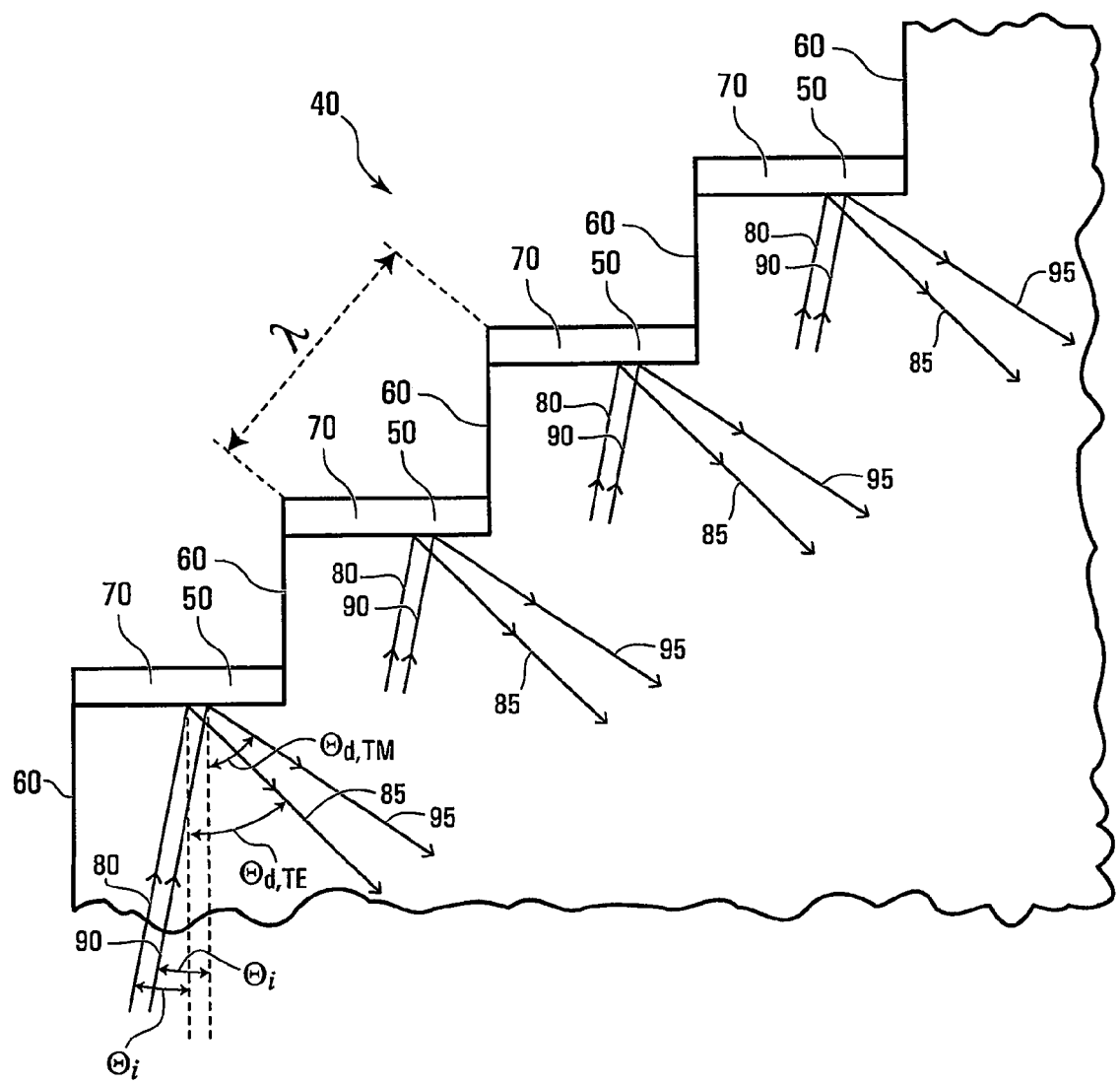
FIG. 1B is a side view of the Echelle grating of FIG. 1A.
Figure 2A:
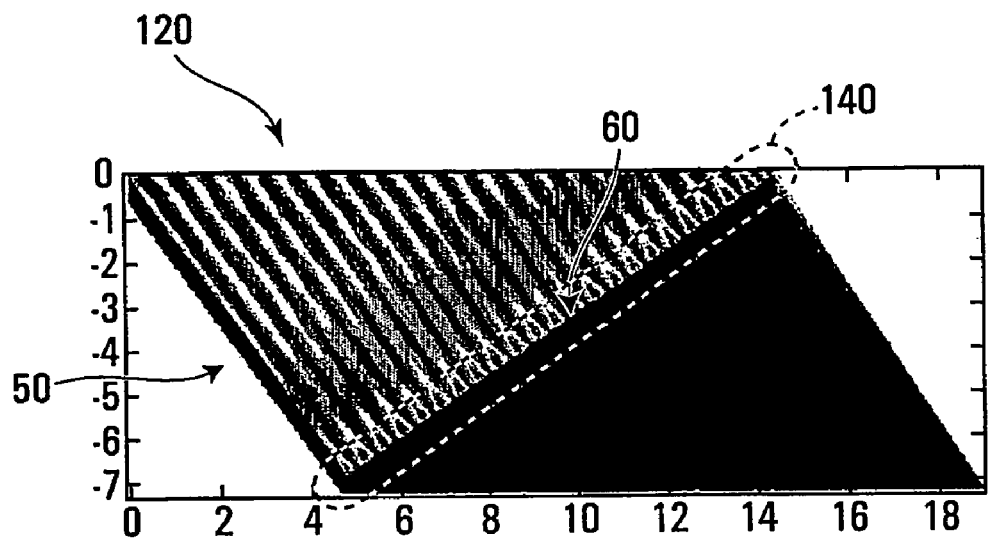
FIG. 2A is a contour plot of a phase-front profile of the intensity of a TE (Transverse Electric) polarization of light at one of reflective facets of the Echelle grating of FIG. 1B for the case where both reflective facets and non-reflective facets are metallized.
Figure 2B:
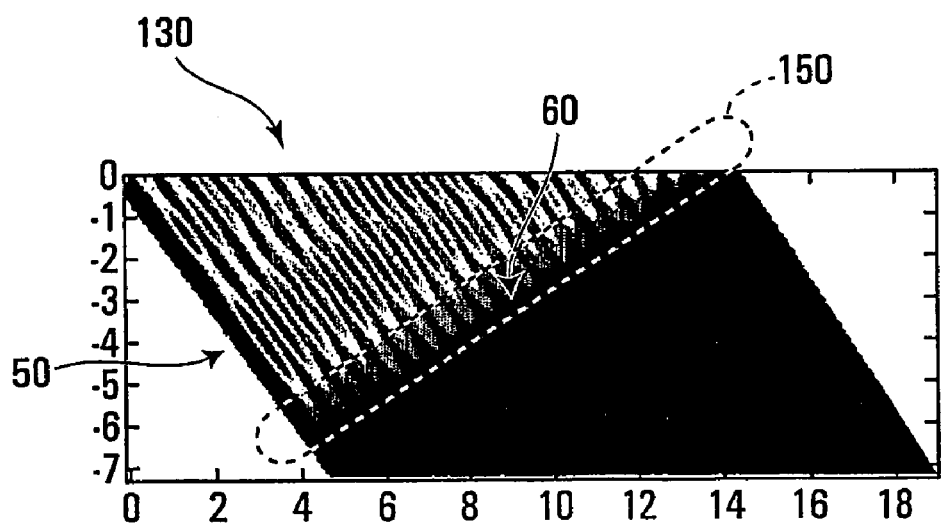
FIG. 2B is a contour plot of a phase-front profile of the intensity of a TM (Transverse Magnetic) polarization of light at one of reflective facets of the Echelle grating of FIG. 1B for the case where both reflective facets and non-reflective facets are metallized.

A field phase-front is calculated for both TE and TM polarizations of light 80, 90 for the Echelle grating 40 of FIGS. 1A and 1B. The grating 40 operates at an order of 22 and the TE and TM polarizations of light 80, 90 are incident at an angle of incidence, $\theta_{in}$, of 55°. FIG. 2A is a contour plot of a phase-front profile of the intensity of the TE polarization of light 80 at one of the reflective facets 50 of FIG. 1B for the case where both reflective facets 50 and non-reflective facets 60 are metallized. FIG. 2B is a contour plot of a phase-front profile of the intensity of the TM polarization of light 90 at one of the reflective facets 50 of FIG. 1B for the case where both reflective facets 50 and non-reflective facets 60 are metallized. The phase-front profiles of FIGS. 2A and 2B are viewed from a direction 110 and are generally indicated by 120 and 130. The non-reflective facet 60 influences the phase-front profiles 120, 130 of the TE and TM polarizations of light 80, 90 close to the non-reflective facet 60 at 140, 150.

Figure 3A:
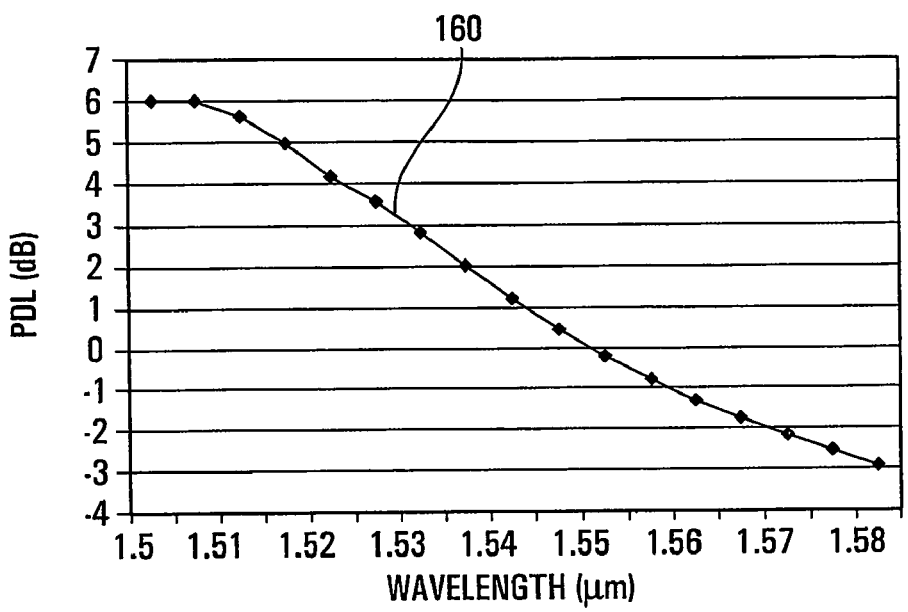
FIG. 3A is a graph of a polarization dependent loss (PDL) for the Echelle grating of FIG. 1B, for order 25, and for an angle of incidence $\theta_{in}$ of 55°, the PDL being plotted as a function of wavelength.

Referring to FIG. 3A, shown is a graph of the PDL for the Echelle grating 40 of FIG. 1B, for order 25, and for an angle of incidence $\theta_{in}$ of 55°, the PDL being plotted as a function of wavelength. The PDL is indicated by curve 160. As shown by curve 160, the metallization on both the facets 50 and the facets 60 introduces a PDL variation of ~5 dB over a wavelength range of 1.52 μm to 1.57 μm, which corresponds to the C-band of optical telecommunications. This wavelength region is chosen only as an example for demonstration purposes.

Figure 3B:
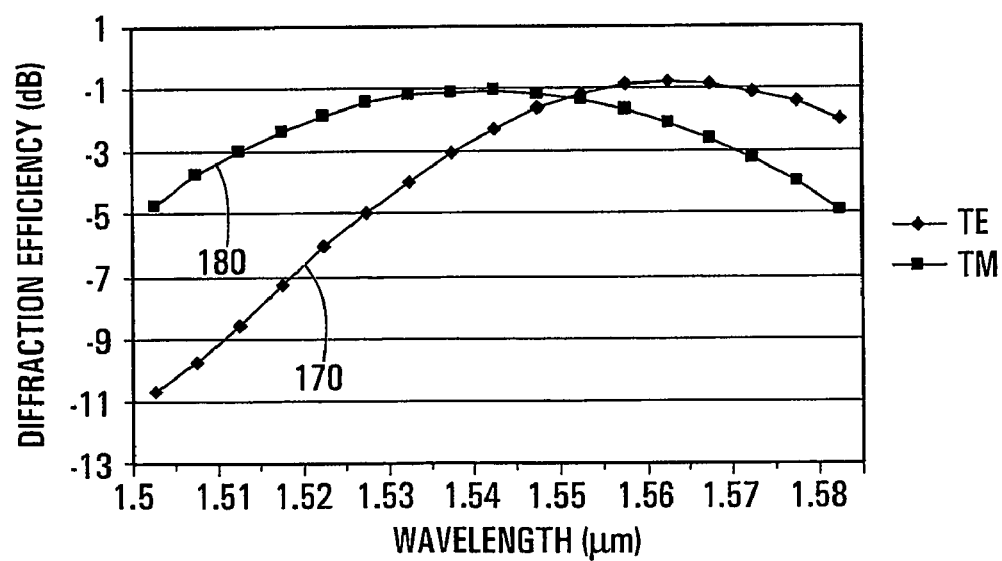
FIG. 3B is a graph of diffraction efficiencies of TE and TM polarizations of light for the Echelle grating of FIG. 1B, for order 25, and for an angle of incidence $\theta_{in}$ of 55°, the diffraction efficiencies being plotted as a function of wavelength.

Referring to FIG. 3B, shown is a graph of the diffraction efficiencies of the TE and TM polarizations of light 80, 90 for the Echelle grating 40 of FIG. 1B, for order 25, and for an angle of incidence $\theta_{in}$ of 55°, the diffraction efficiencies being plotted as a function of wavelength. The diffraction efficiencies of the TE and TM polarizations of light 80, 90 are indicated by curves 170, 180, respectively.

Figure 4A:
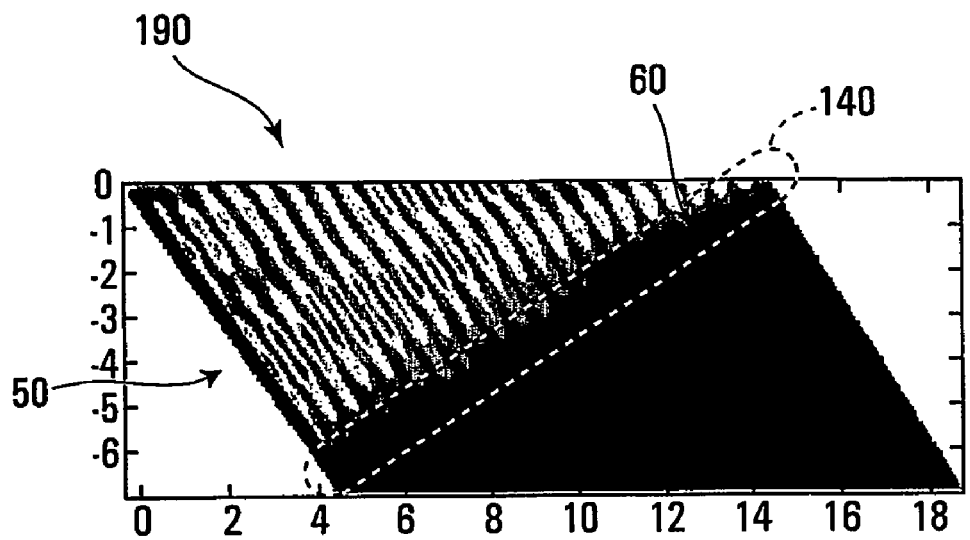
FIG. 4A is a contour plot of a phase-front profile of the intensity of a TE polarization of light at one of the reflective facets of FIG. 1B for the case where only the reflective facets are metallized.
Figure 4B:
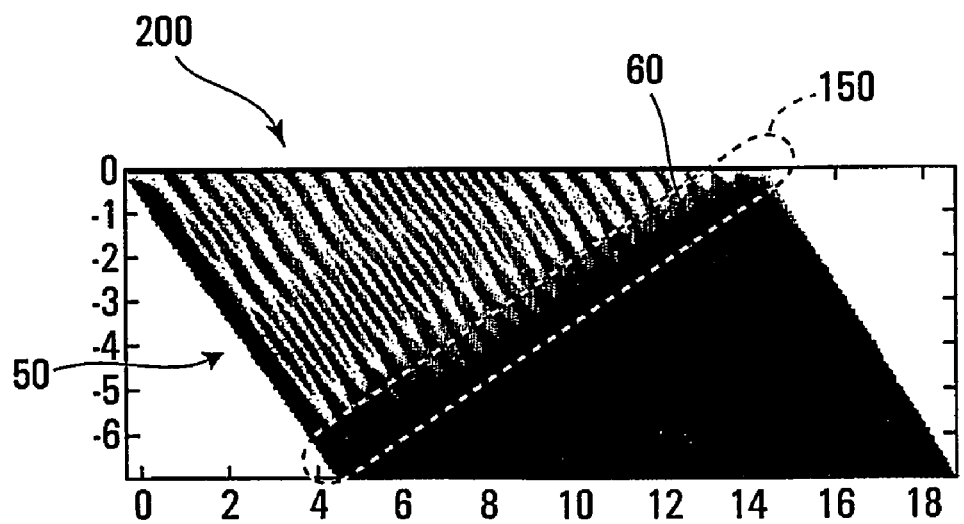
FIG. 4B is a contour plot of a phase-front profile of the intensity of a TM polarization of light at one of the reflective facets of FIG. 1B for the case where only the reflective facets are metallized.

A substantial reduction in polarization can be achieved if only the reflective facets 50 are metallized with the non-reflective facets 60 not being metallized. Assuming that this could be accomplished through perfect directional etching or perfect directional deposition, phase-fronts have been simulated for a case in which the grating 40 has metallized reflective facets 50 and non-metallized facets 60. FIG. 4A is a contour plot of a phase-front profile of the intensity of a TE polarization of light 80 at one of reflective facets 50 of FIG. 1B for the case where only the reflective facets 50 are metallized. FIG. 4B is a contour plot of a phase-front profile of the intensity of a TM polarization of light at one of reflective facets of FIG. 1B for the case where only the reflective facets 50 are metallized. The phase-front profiles of FIGS. 4A and 4B are generally indicated by 190, 200, respectively, and are substantially similar to each other. In FIG. 5B, shown is a graph of the diffraction efficiencies of the TE and TM polarizations of light 80, 90 for the Echelle grating 40 of FIG. 1B, for order 22, and for an angle of incidence $\theta_{in}$ of 56°, the diffraction efficiencies being plotted as a function of wavelength. The TE and TM polarizations of light 80, 90 are indicated by curves 210 and 220, respectively, and are also similar to each other.

Figure 5A:
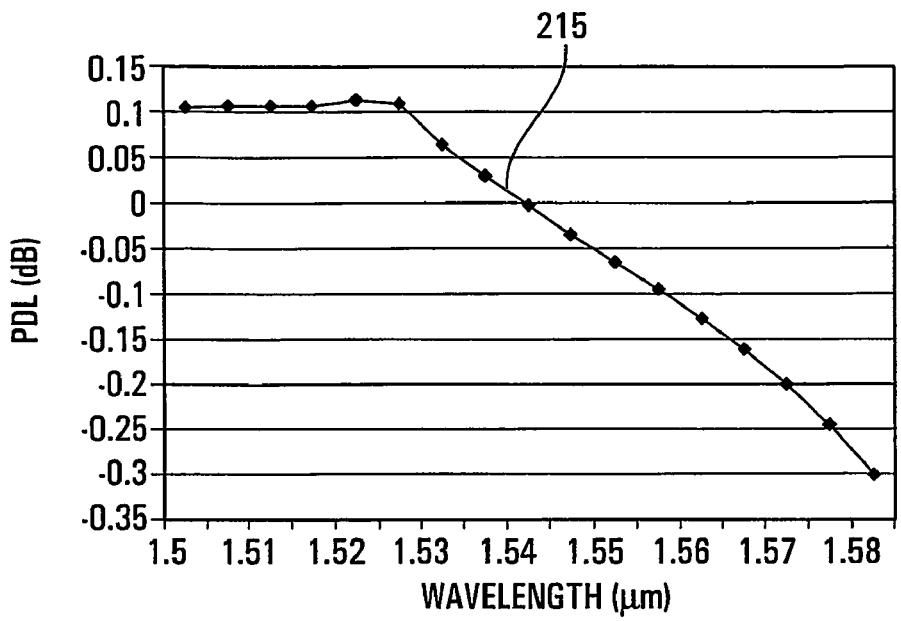
FIG. 5A is a graph of the PDL for the Echelle grating of FIG. 1B, for order 22, and for an angle of incidence $\theta_{in}$ of 56°, the PDL being plotted as a function of wavelength.
Figure 5B:
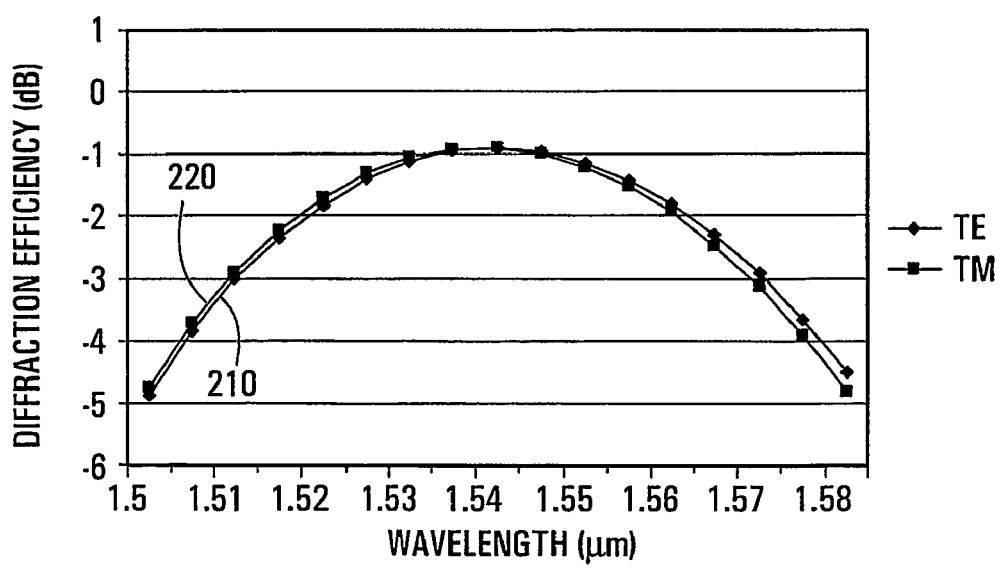
FIG. 5B is a graph of the diffraction efficiencies of TE and TM polarizations of light for the Echelle grating of FIG. 1B, for order 22, and for an angle of incidence $\theta_{in}$ of 56°, the diffraction efficiencies being plotted as a function of wavelength.

In FIG. 5A, shown is a graph of the PDL for the Echelle grating 40 of FIG. 1B, for order 22, and for an angle of incidence $\theta_{in}$ of 56°, the PDL being plotted as a function of wavelength. The PDL is shown by curve 215. A comparison between the curve 215 for the case where only the reflective facets 50 are metallized and curve 160 of FIG. 3A for the case where both the reflecting and non-reflective facets 50, 60 are metallized confirms the large influence of metal on the non-reflective facets 60. Nonetheless, there is still residual PDL as shown by curve 215 which is wavelength dependent with curve 215 showing a variation in PDL of ~0.25 dB over the wavelength range of 1.52 µm to 1.57 µm. This dependence of the PDL on the wavelength is due to other factors such as edge diffraction, diffraction into other orders, etc. The dependence of the PDL on the wavelength differs for the TE and TM polarizations of light 80, 90. The main drawback of this approach is the non-uniformity of the metal coverage on the reflective facets 50 and non-uniformity in removal of metal from the non-reflective facets 60 due to problems such as shadowing, which prevent perfectly directional processes from occurring. This introduces unacceptable and uncontrollable PDL and wavelength dependence of the PDL.

PDL Reduction by Partial Metallization of the Reflective Facets 50

Removal of metal from the non-reflective facets 60 is difficult, if not impossible, to do completely without affecting the metallization of the reflective facets 50. As discussed above, this is because some form of directional etch is required. If the non-reflective facets 60 are curved, then shadowing effects will prevent complete removal of metal from the non-reflective facets 60 where metal is not wanted. Embodiments of the invention provide methods for partial metallization of reflective facets and provide gratings featuring such partial metallization.

Figure 6:
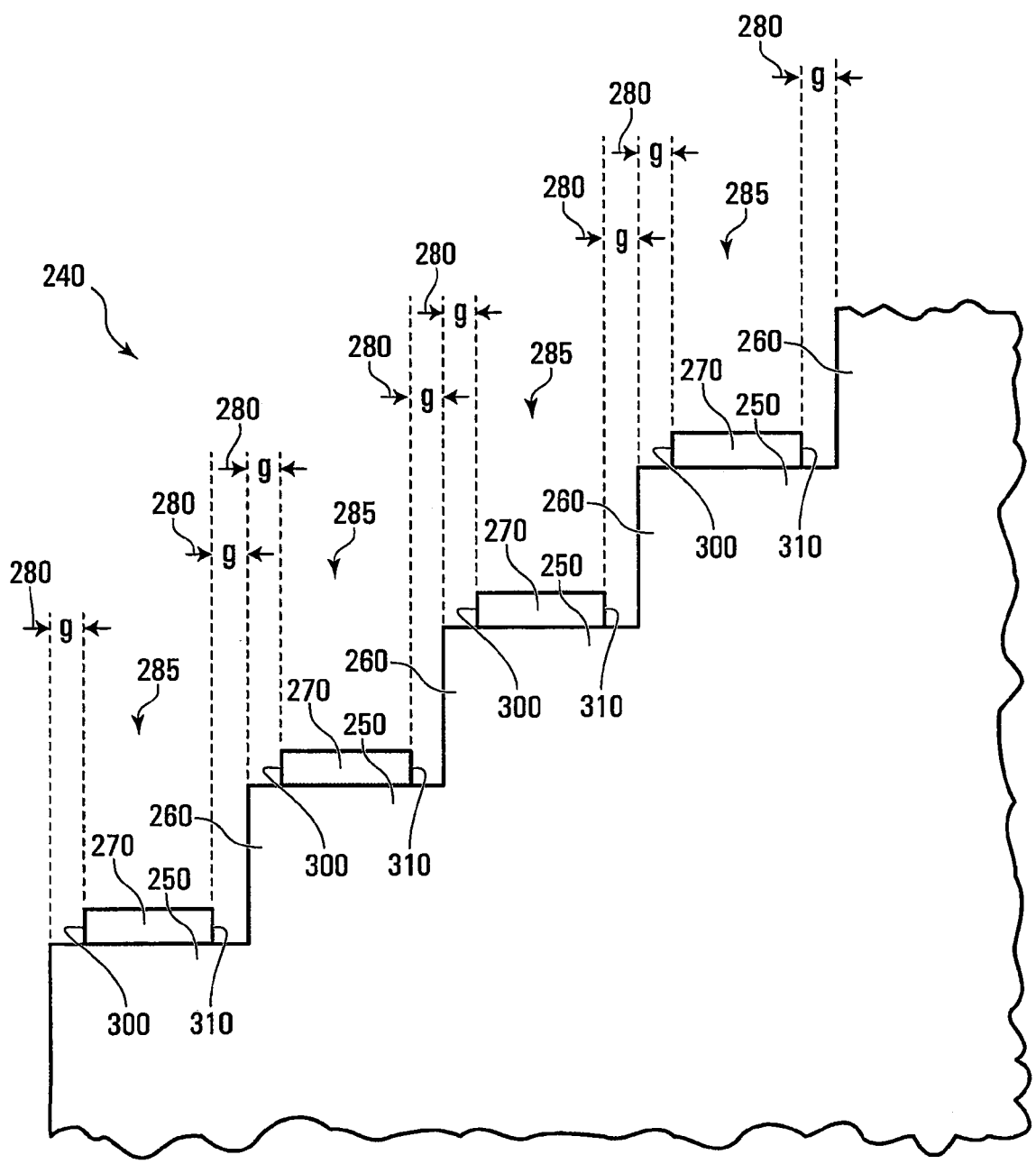
FIG. 6 is a schematic of an example Echelle grating which is partially metallized in accordance with an embodiment of the invention.

Referring to FIG. 6, shown is a schematic of an example Echelle grating which is partially metallized in accordance with an embodiment of the invention. The Echelle grating is generally indicated by 240 and has reflective facets 250 and non-reflective facets 260. The reflective facets 250 are coated with a metallic coating 270 that partially coats the reflective facets 250 leaving gaps 280 uncoated on the reflective facets 250.

In the embodiment of FIG. 6, each groove 285 is defined by a non-reflective facet 260 (sidewall) and a reflective facet 250 perpendicular to the non-reflective facet 260. In other embodiments of the invention, angles other than 90° between the non-reflective facets 260 and reflective facets 250 are used.

Figure 7:
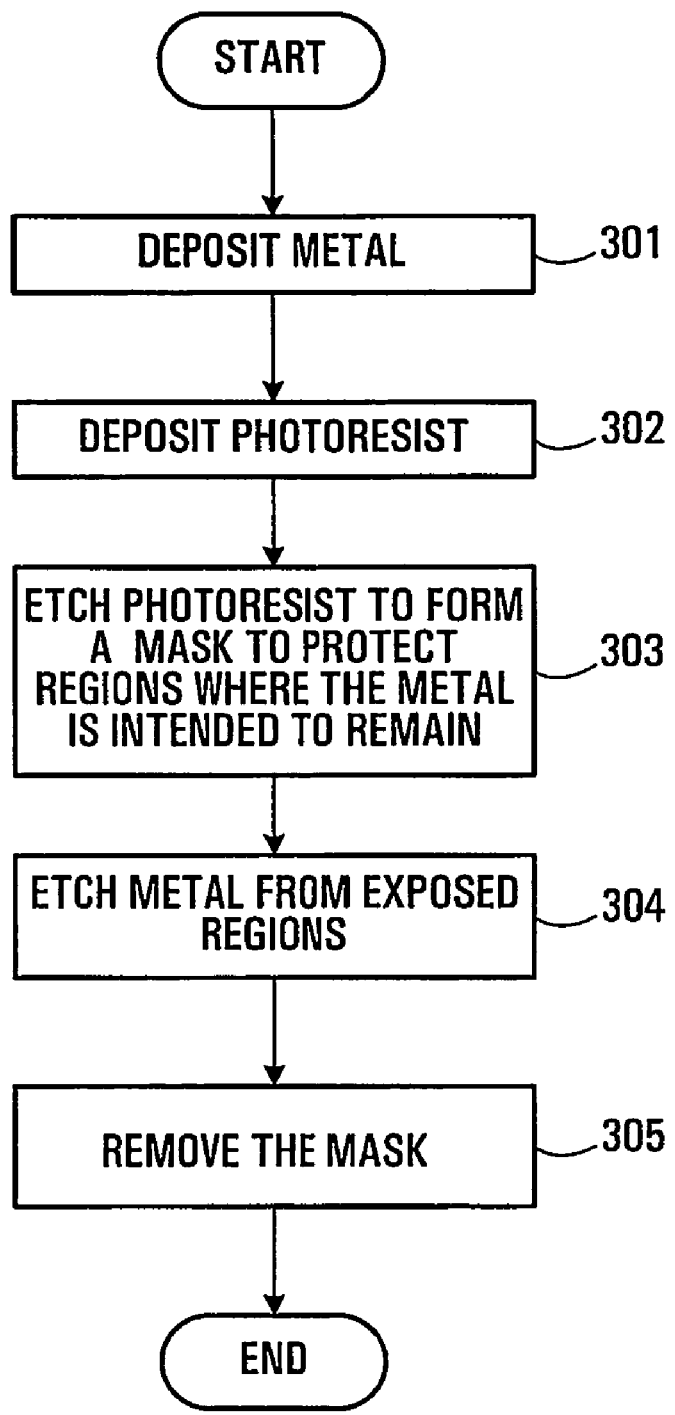
FIG. 7 is a flow chart of a method of fabricating the grating of FIG. 6 according to another embodiment of the invention.

Referring to FIG. 7, shown is a flow chart of a method of fabricating the grating 240 of FIG. 6 according to another embodiment of the invention. The grating 240 is fully metallized by depositing a metal onto the grating 240 (step 301). A photoresist is then deposited (step 302), followed by a masking (step 303) which leaves protected regions where the metal is intended to remain. The metal is then etched away from the exposed regions (step 304). A gap 280 remains surrounding the reflective facets 250 and defines the metallization regions of the reflective facets 250. At step 305, the mask is removed.

By controlling a width, g, of the gaps 280, the PDL can be varied. Of course, increasing the width, g, results in more light leaking through the reflective facets 250 leading to increased insertion loss (or equivalently, a net loss). Thus, there is a trade-off between the PDL and the net loss which depends upon the application. The width, g, also depends upon the limitation of the photolithography process being used to produce to the metallic coatings 270. The main advantage of this approach is process repeatability, process controllability, and further reduced PDL. Preferably the metallized coatings 270 are centered within respective ones of the reflective facets 250; however, this is not essential to the invention.

Embodiments of the invention are not limited to the above method of fabricating the grating 240 and in other embodiments, the grating 240 is manufactured using a lift-off process. In the lift-off process, the photoresist in the region of the facets 250, 260 is deposited, patterned, and etched, leaving a substantial but incomplete fraction of each reflective facet 250 exposed. Reflective metal is then deposited on the Echelle grating 240 followed by lift-off of remaining photoresist and metal attached to the photoresist.

Figure 8A:
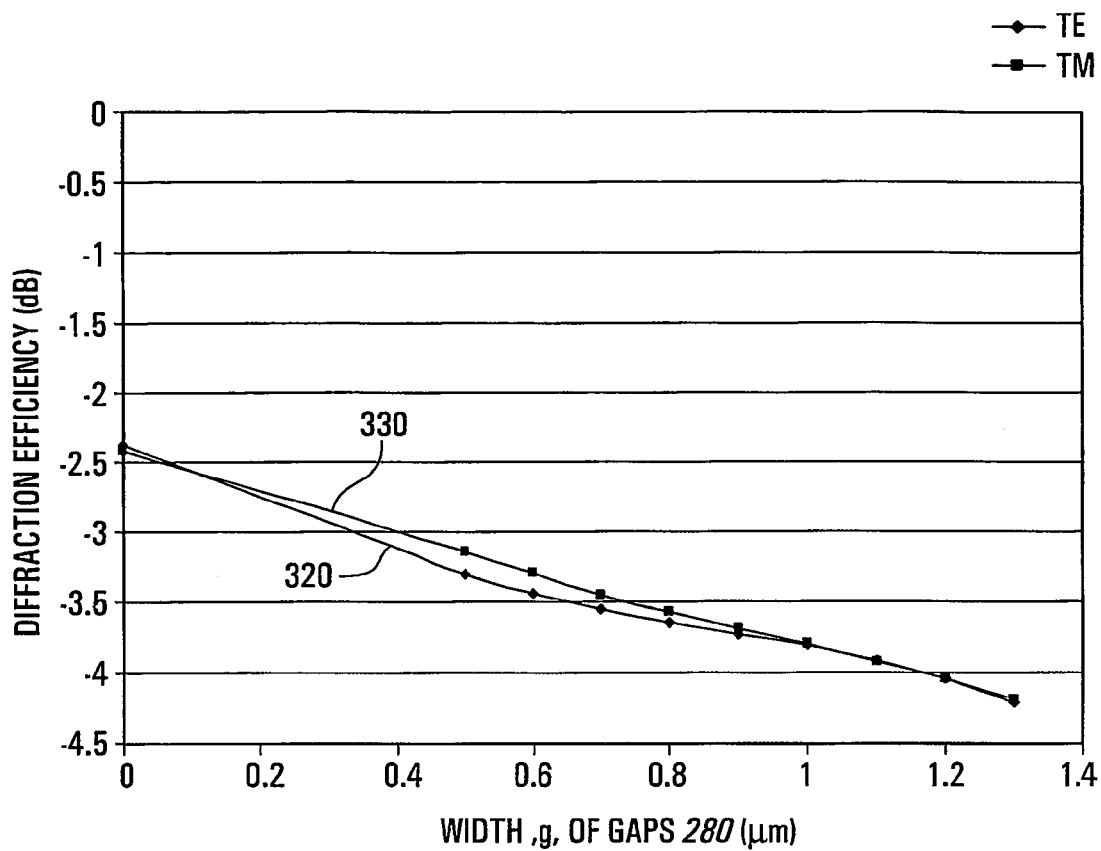
FIG. 8A is a graph of a worst-case diffraction efficiency for TE and TM polarizations of light plotted as a function of a width, g, of gaps of reflective facets of FIG. 6.
Figure 8B:
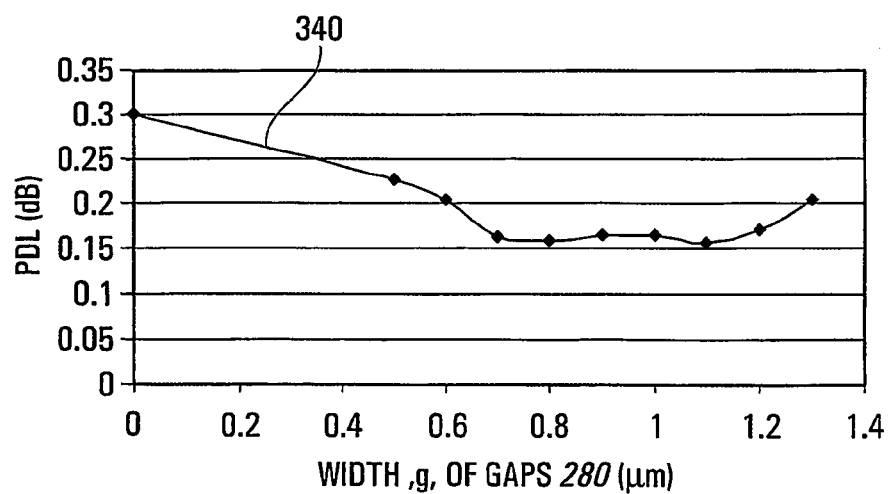
FIG. 8B is a graph of a PDL plotted as a function of the width, g, of the gaps of the reflective facets of FIG. 6.

The diffraction efficiency and PDL have been calculated to demonstrate the effect of the metallized coatings 270 partially covering the reflective facets 250. In particular, calculations have been made for embodiments of the invention in which there is partial coverage of the metallic coatings 270; the gaps 280 are present at both ends 300, 310 of the reflective facets 250; and the non-reflective facets 260 are not metallized. FIG. 8A is a graph of a worst-case diffraction efficiency for TE and TM polarizations of light plotted as a function of the width, g, of the gaps 280 of the reflective facets 250 of FIG. 6. The worst-case diffraction efficiency is defined as the lowest diffraction efficiency over the telecommunications C-band from 1.52 to 1.57 µm. As shown by curves 320, 330 in FIG. 8A, the diffraction efficiency decreases with increasing width, g, of the gaps 280 for both TE and TM polarizations of light. FIG. 8B is a graph of a worst-case PDL plotted as a function of the width, g, of the gaps 280 of the reflective facets 250 of FIG. 6. The worst-case PDL is defined as the largest PDL over the telecommunications C-band, from 1.52 µm to 1.57 µm. In FIG. 8B, a curve 340 shows a decrease in the PDL with increasing width, g, until approximately 0.7 µm where the curve 340 flattens. At a width, g, of approximately 1.1 µm, the curve 340 shows the PDL beginning to increase with increasing width, g. In general, the effects demonstrated in this invention are not affected significantly by the diffraction order employed. For simplicity, all further calculations are performed for identical grating conditions with a grating of order 22, with a grating angle of 56°, and a grating period Λ of ~14.4 μm. However, it is to be clearly understood that the invention is not limited to these particular conditions.

Figure 9:
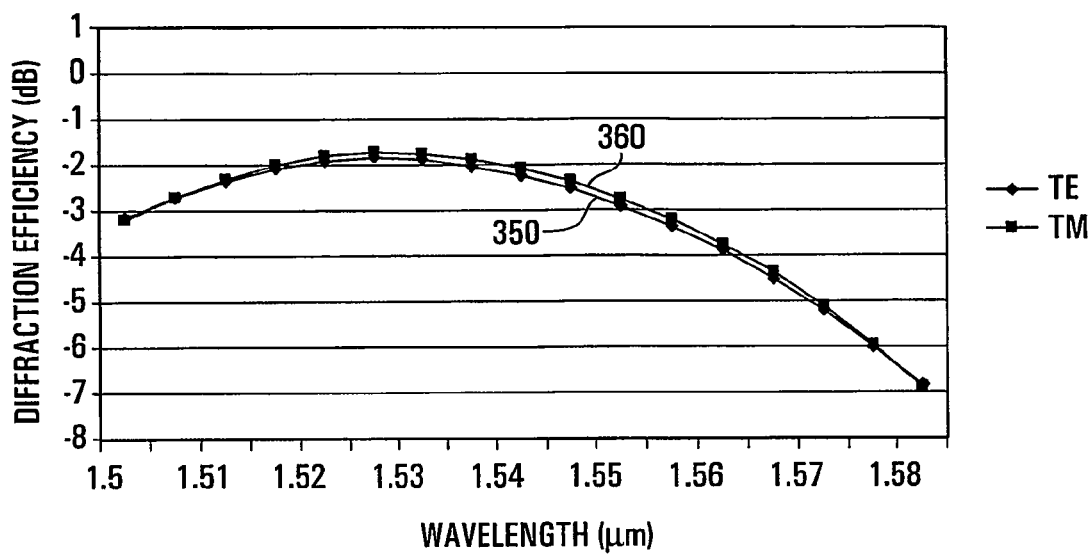
FIG. 9 is a graph of the diffraction efficiencies of TE and TM polarizations of light plotted as a function of the wavelength of the TE and TM polarizations of light, the gaps of the reflective facets of FIG. 6 having a width, g, of 0.7 µm.
Figure 10:
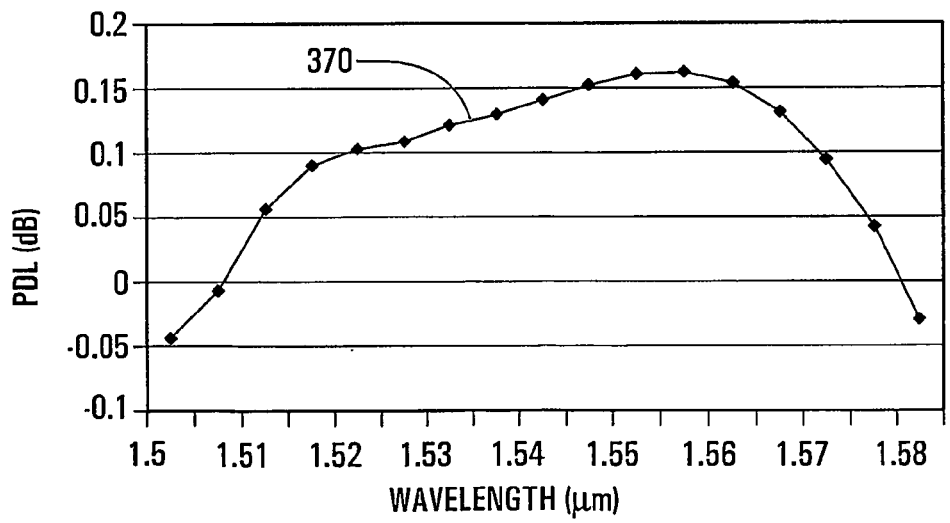
FIG. 10 is a graph of a worse-case PDL plotted as a function of wavelength, the gaps of the reflective facets of FIG. 6 having a width, g, of 0.7 µm.

Referring to FIG. 9, shown is a graph of the diffraction efficiency of TE and TM polarizations of light plotted as a function of the wavelength of the TE and TM polarizations of light, the gaps 280 of the reflective facets 250 of FIG. 6 having a width, g, of 0.7 μm. Curves 350, 360 for the TE and TM polarizations of light, respectively, show a blaze which is non-centered, and a slight shift of the blaze to higher wavelengths would even off the insertion loss at 1.52 μm versus 1.57 μm. In FIG. 10, shown is a graph of the PDL plotted as a function of wavelength, the gaps 280 of the reflective facets 250 of FIG. 6 having a width, g, of 0.7 μm. The PDL is shown by curve 370. The worst-case PDL shown by curve 370 is ~0.16 dB and occurs at a wavelength of approximately 1.555 μm. Shifting the blaze will shift the wavelength at which this worst-case PDL occurs, but does not affect the value of this worst-case PDL.

As the metallized coatings 270 are reduced in size, (or equivalently, as the width, g, is increased) less light is reflected by the facets 250. However, a diffraction envelope of the facets 250 broadens with a reduction in size of the metallic coatings 270. Thus, while the diffraction efficiency decreases with decreasing size of the metallic coatings 270, the decrease in the diffraction efficiency is less significant for wavelengths at the edges of the C-band than for wavelengths close to the center of the C-band.

FIGS. 8A and 8B demonstrate the results of the trade-off between the loss and the unmetallized gap size. In FIG. 8B, curve 340 shows of a minimum of ~0.15 dB in the PDL for an embodiment in which the gaps 280 have a width, g, of ~0.7 μm. In FIG. 8A, curves 320, 330 show worst-case diffraction efficiency values for TE and TM polarizations of light, respectively, over the telecommunications C-band from 1.52 to 1.57 μm. The difference between these values of FIG. 8A does not indicate PDL. In FIG. 8B, the PDL corresponds to a worst-case (largest magnitude) PDL at any given wavelength over the telecommunications C-band from 1.52 μm to 1.57 μm. In products where PDL is more of a concern than net loss (for example, in optical performance monitors or channel monitors used in optical telecommunications, and spectrometers used for absorption) the tradeoff is acceptable.

Referring back to FIG. 9, assuming that centering the blaze brings the efficiencies at 1.52 μm and 1.57 μm to be equal, the "worst-case diffraction efficiency" is the average of the efficiencies at 1.52 μm and 1.57 μm (wavelengths outside of the 1.52 to 1.57 μm are not part of the C-band which is used to illustrate the present invention). As shown by curve 340 in FIG. 8B, a minimum PDL is obtained for a width, g, of the gaps 280 of approximately 0.7 μm.

Partial or Full Reflective Facets Through Microfabricated Trenches: Metal Coverage on Reflective Facet and Non-reflective Facets Rendered Effectively Invisible The performance shown above for the Echelle grating 240 of FIG. 6 can be further controlled.

Figure 11:
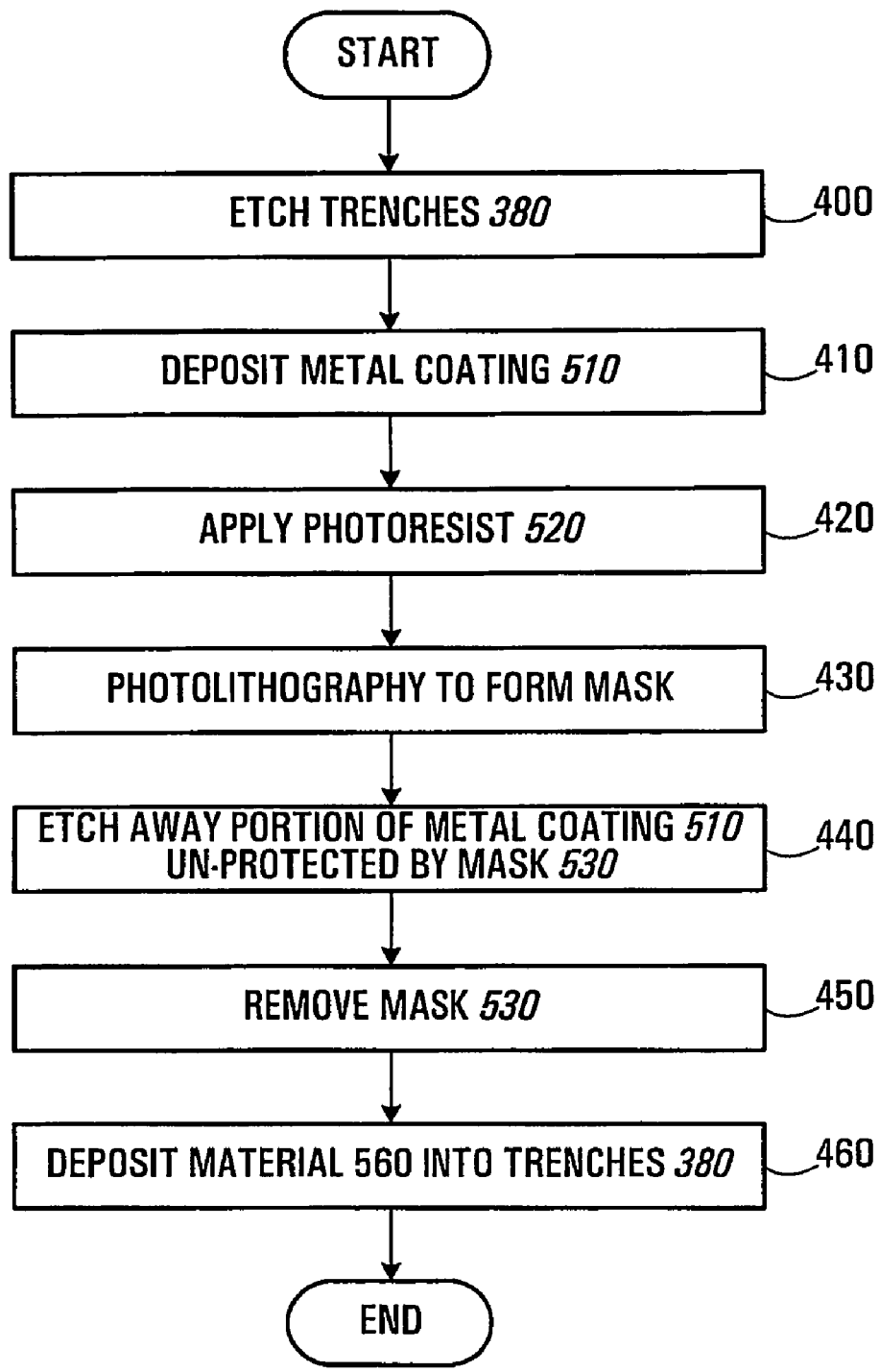
FIG. 11 is a flow chart of a method of fabricating an Echelle grating according to another embodiment of the invention.
Figure 12A:
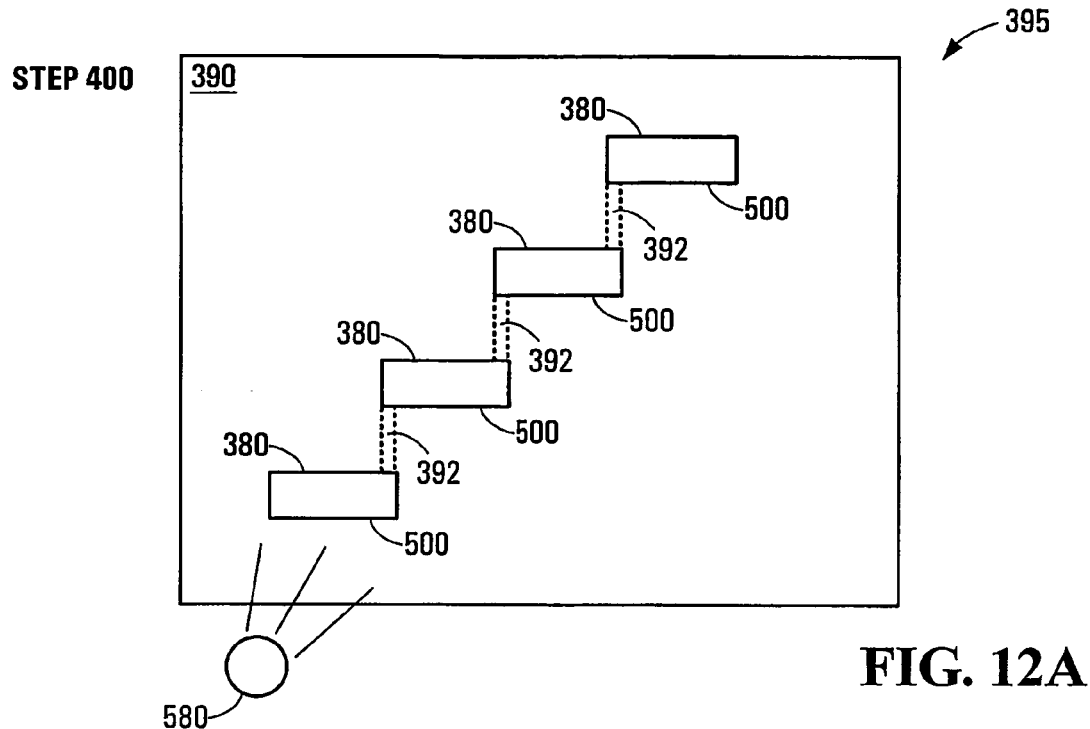
FIGS. 12A to 12G are schematics of an Echelle grating at various stages of manufacturing using the method of FIG. 11.
Figure 12B:
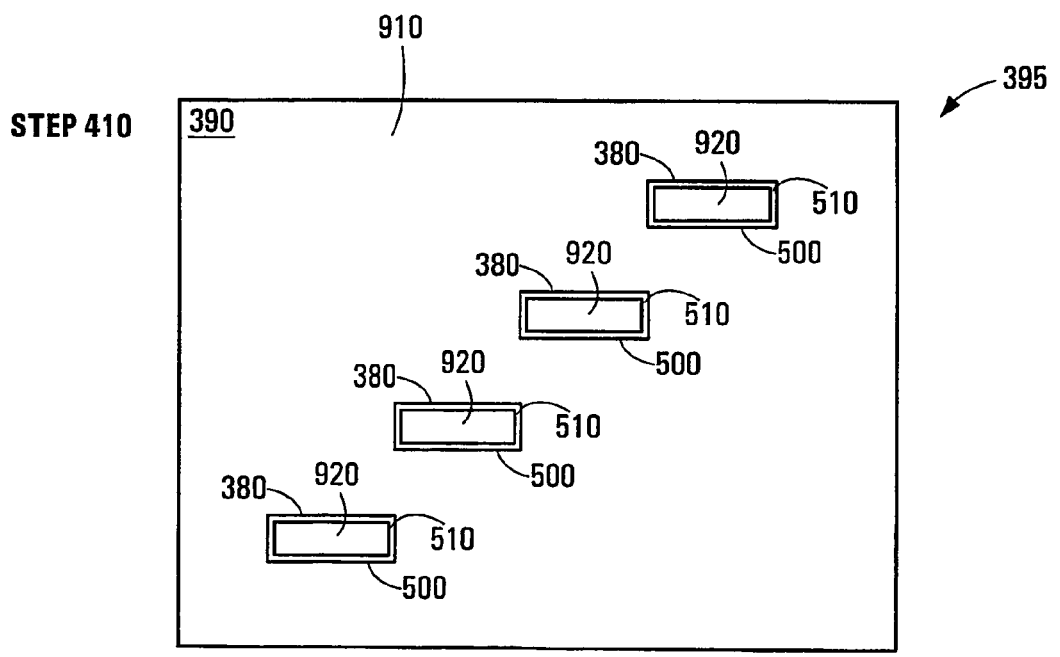
Figure 12C:
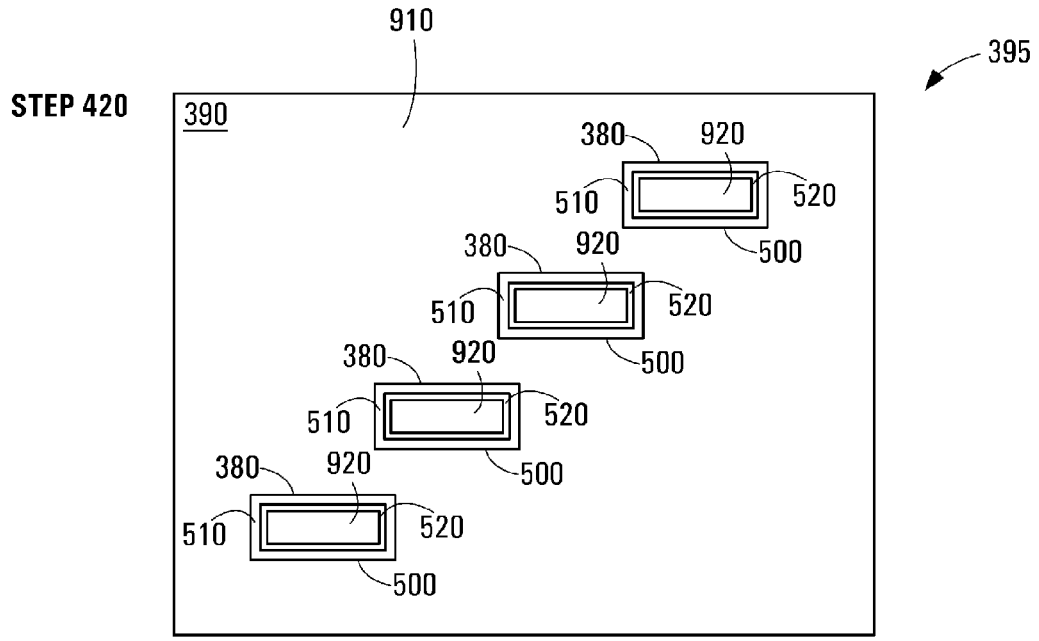
Figure 12D:
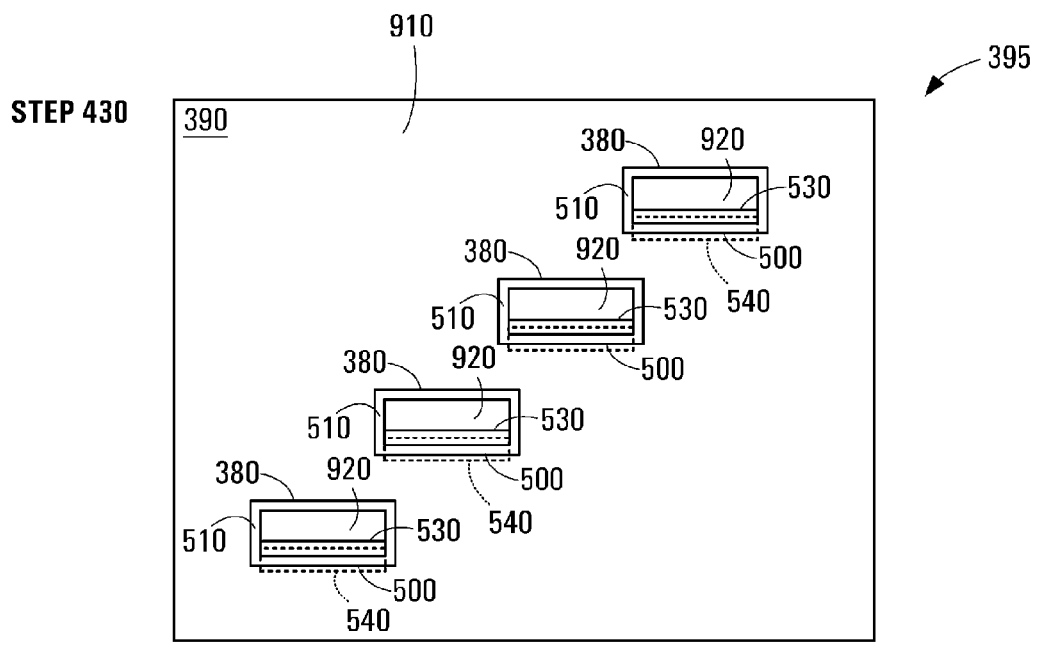
Figure 12E:
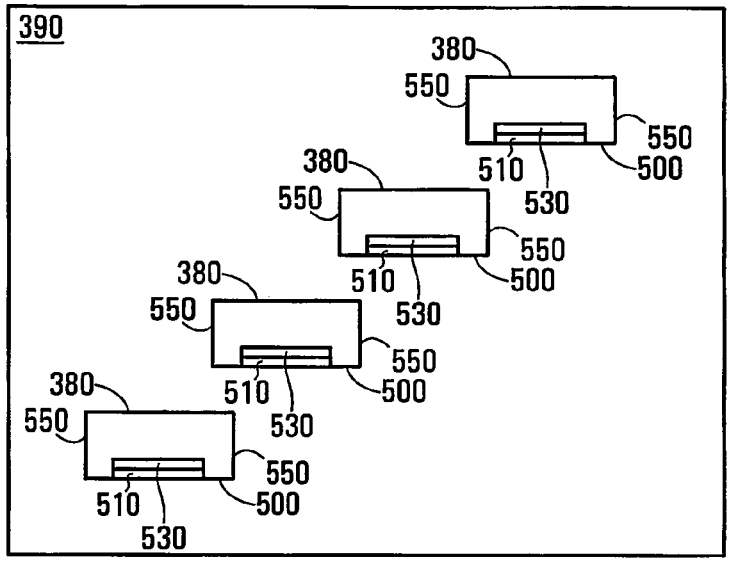
Figure 12F:
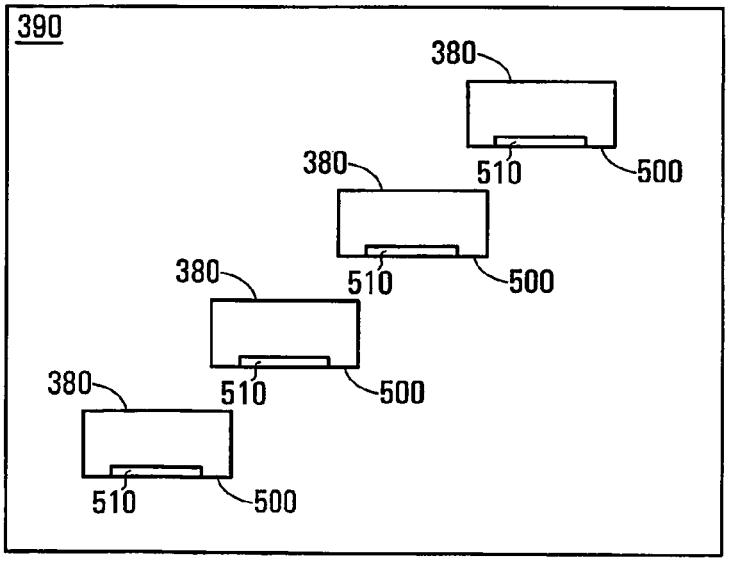

Referring to FIG. 11, shown is a flow chart of a method of fabricating an Echelle grating according to another embodiment of the invention. Schematics of an Echelle grating at various stages of manufacturing using the method of FIG. 11 are shown in FIGS. 12A to 12G. At step 400, a plurality of trenches 380 as shown in FIG. 12A, are etched perpendicular to an optical waveguiding layer 390 with one face of each trench forming a reflective facet 500. The waveguiding layer 390 forms part of an optical waveguide generally indicated by 395. The dimensions of the trenches 380 are dependent upon the lithography process selected. The trenches 380 are deep etched and adjacent ones of the trenches 380 overlap as shown at 392. At step 410 (FIG. 12B), a metal coating 510 is deposited. The metal coating 510 covers walls of the trenches 380 together with bottoms 920 of the trenches 380 and a surface 910 of the optical waveguiding layer 390. At step 420 (FIG. 12C), a photoresist 520 is deposited on the reflective facets 500 and other facets of the trenches 380. At step 430 (FIG. 12D), the photoresist 520 is patterned to form a mask 530 that defines a metallized region 540 of the reflective facets 500. The mask 530 is formed to pattern the metal coating 510 of the reflective facets 500. The overlap accuracy between the mask 530 and the original trenches 380 is not important, as long as the overlap accuracy between adjacent ones of the metallized regions 540 under the mask 530 is high (submicron). At step 440 (FIG. 12E), a portion of the metal coating 510, which is unprotected by the mask 530, is etched away. In some embodiments of the invention, a dry etch process is employed in order to remove metal that is on the bottoms 920, the surface 910, and on faces perpendicular to the reflective and non-reflective facets 500, 550. At step 450 (FIG. 12F), the mask 530 is removed. At step 460 (FIG. 12G), a groove-filling material 560 having a refractive index similar to that of the waveguiding layer 390 is deposited into the trenches 380. The groove-filling material 560 is an optical material that is transparent to light of a pre-determined wavelength. In some embodiments of the invention, the groove-filling material 560 has a layer structure and indices similar to the optical waveguide 395.

Alternatively, in other embodiments of the invention, a "lift-off" technique may be used in which the photoresist 520 is deposited, patterned, and etched leaving a substantial but incomplete fraction of each reflective facet 500 exposed. The metal coating 510 (reflective metal) is then deposited followed by lift-off of remaining photoresist and the metal attached to it.

The result is a series of metallized facets 570 which appear as suspended strips of metal. There are no non-reflective facets. In the metallization mask sequence (steps 400, 410, 420, 430 of FIG. 11), a metallization width, w, can be chosen to create a controlled amount of metallization on each reflective facet 570. As shown in FIG. 12A, at step 400 the trenches 380 can be made rather wide, overlapping the adjacent trenches 380 (as viewed from an input source of light 580). This can allow for a positioning tolerance in the placement of the mask 530 with respect to edges 590 (see step 430 in FIG. 12D) of the trenches 380. Since the trenches 380 are backfilled with the groove-filling material 560 having refractive index similar to that of the waveguiding layer 390, reflective facets 570 are defined by the metallized regions 540 of the trenches 380, and not by the side edges 590 of the trenches 380 themselves. The side edges 590 are rendered invisible by the groove-filling material 560 (or index matching material). In the case of silica planar waveguides, the groove-filling material 560 could be any glasslike material or optical polymers with refractive indices similar to that of the waveguiding layer 390.

When there are multiple indices involved, as in the case of optical waveguides, the optical mode which propagates in the waveguide will have an effective index based on the waveguide structure and on the multiple indices involved in the creation of the optical waveguide. In such embodiments of the invention, the groove-filling material 560 could either have layers of material with multiple refractive indices and thicknesses matching the waveguide structure, or more simply a single refractive index matched to an effective index of a waveguide propagating mode. Index matching of the groove filling material 560 is not critical. For glass-based optical waveguides, having effective refractive indices of approximately 1.46 and multiple layer indices varying within 0.015 of each other, the index matching of the groove-filling material 560 can be in error by as much as 0.1 without detrimental effects to the workings of the invention.

Figure 12G:
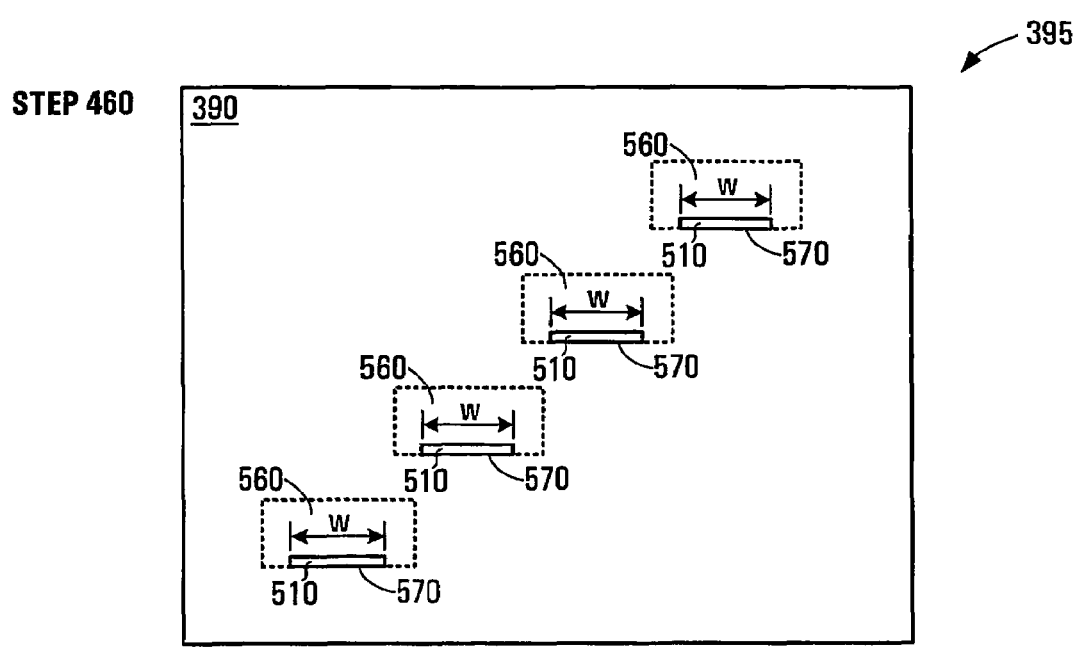
Figure 13A:
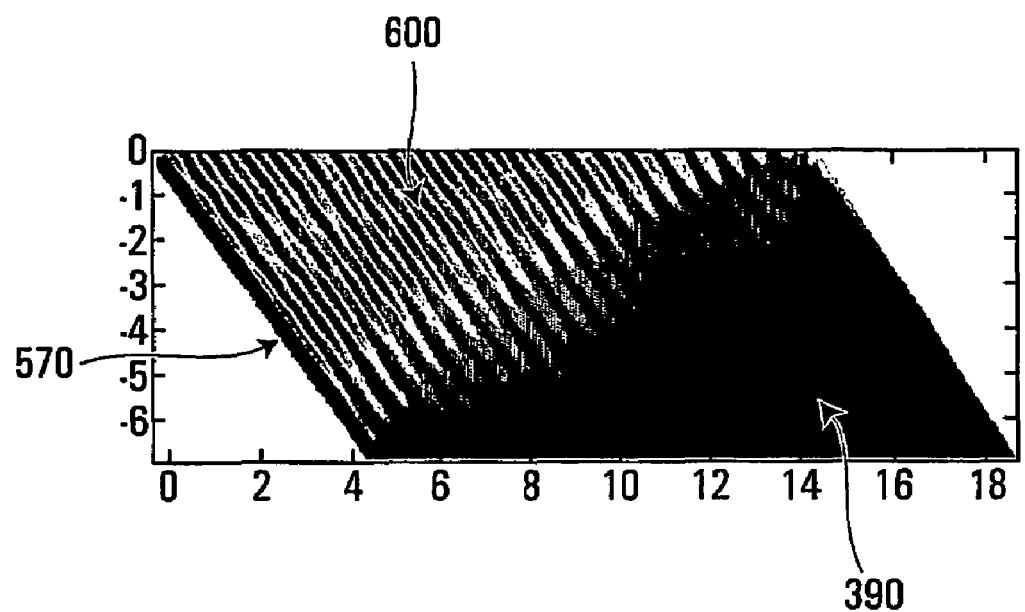
FIG. 13A is a contour plot of a phase-front profile of the intensity of a TE polarization of light at one of reflective facets of the Echelle grating of FIG. 12G.
Figure 13B:
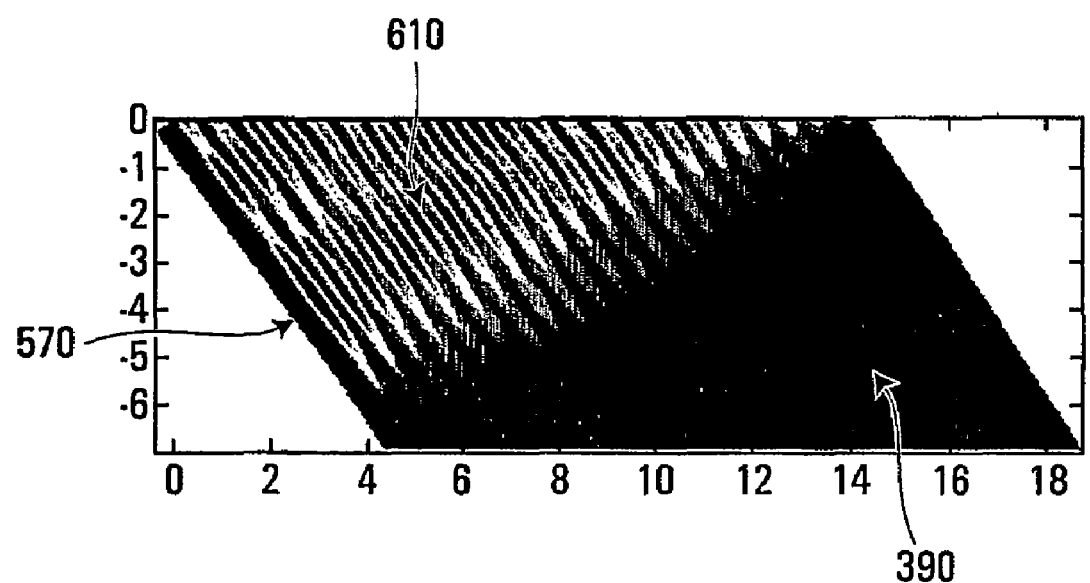
FIG. 13B is a contour plot of a phase-front profile of the intensity of a TM polarization of light at one of reflective facets of the Echelle grating of FIG. 12G.

The behavior of a field phase-front has been carried out for the grating of FIG. 12G. As shown by TE and TM field intensities 600 and 610, respectively, in FIGS. 13A and 13B, TE and TM polarizations of light are diffracted in a very similar manner from the reflective facets 570 for a grating structure in the absence of any sidewalls. Thus, any polarization dependence is significantly eliminated.

Figure 14:
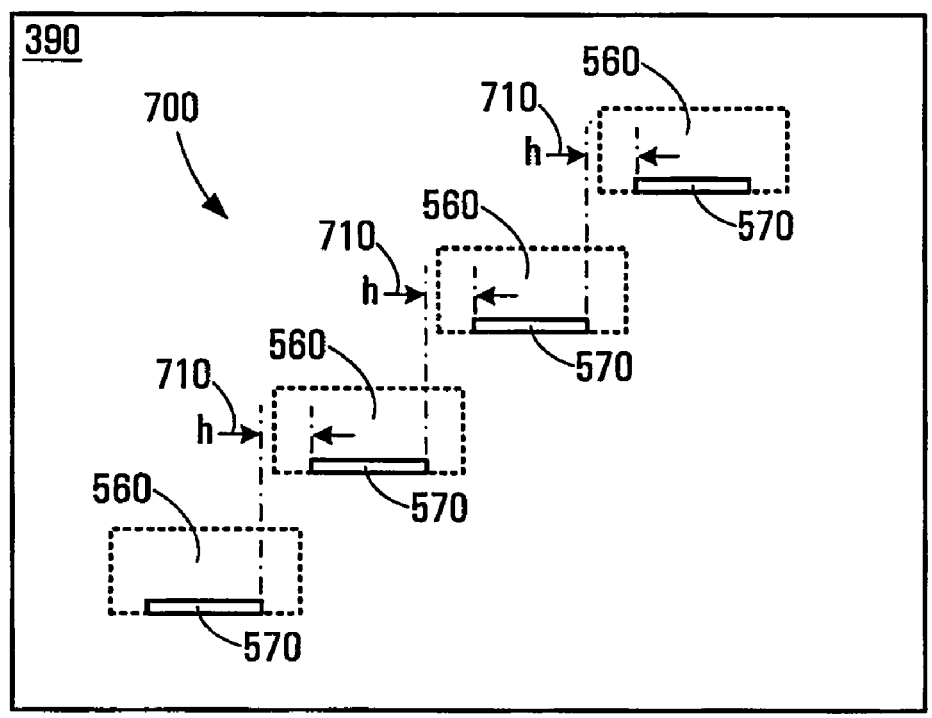
FIG. 14 is a schematic of a grating structure, according to another embodiment of the invention.
Figure 15:
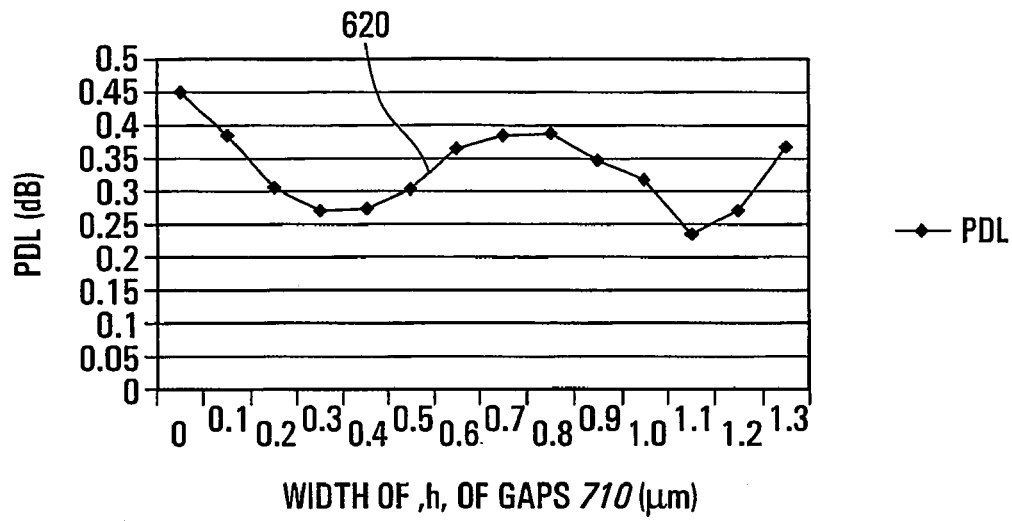
FIG. 15 is a graph of a worst-case PDL, over a range of wavelengths from 1.52 μm to 1.57 μm, plotted as a function of a width, h, of gaps of a diffraction grating structure of FIG. 14.

Referring to FIG. 14, shown is a schematic of a grating structure, according to another embodiment of the invention. The grating structure is generally indicated by 700 and is similar to the grating structure of FIG. 12G except that there are gaps 710 of width, h, between adjacent ones of the reflective facets 570. In FIG. 15, shown is a graph of a worst-case PDL, over a range of wavelengths from 1.52 µm to 1.57 µm, plotted as a function of the width, h, of the gaps 710 for the diffraction grating structure 700 of FIG. 14. The PDL, shown by curve 620, shows a variation which is a strong function of the width, h, and hence the width, h, must be determined in relation to the grating geometry, operating wavelength, operating parameters and the allowable insertion loss.

Figure 16:
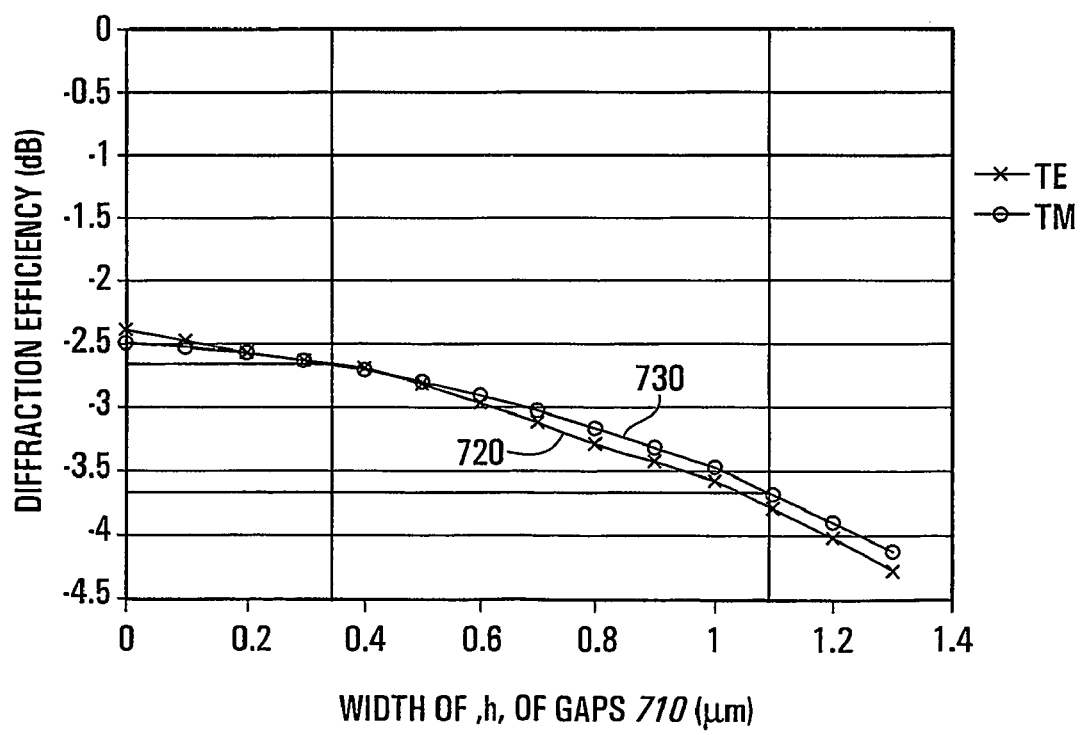
FIG. 16 is a graph of a worst-case diffraction efficiency, over a wavelength range from 1.52 μm to 1.57 μm, plotted as a function of the width, h, of the gaps of the diffraction grating structure of FIG. 14, the worst-case diffraction efficiency being plotted for both TE and TM polarizations of light.

The curve 620 shows minima in the PDL at widths, h, of approximately 0.3 µm and 1.1 µm of the gaps 710. FIG. 16 is a graph of a worst-case diffraction efficiency over a wavelength range from 1.52 µm to 1.57 µm plotted as a function of the width, h, of the gaps 710 for the diffraction grating structure 700 of FIG. 14, the worst-case diffraction efficiency being plotted for both TE and TM polarizations of light. Curves 720, 730 show the worst-case diffraction efficiency for the TE and TM polarizations of light, respectively. For a width, h, of approximately 0.3 µm, there is an excess reduction in diffraction efficiency of only ~0.2 dB which makes the diffraction grating structure 700 more interesting for applications requiring low PDL and low insertion loss.

The magnitude of the PDL as shown by curve 620 in FIG. 15 for the diffraction grating structure 700 of FIG. 14 is very similar to the PDL shown by curve 340 in FIG. 8B for the Echelle grating 240 of FIG. 6. However, it is important to note that conventional fabrication of fully metallized reflective facets in combination with completely unmetallized sidewalls is difficult (perhaps impossible) to achieve as it requires either directional metallization or directional metal removal. In the case of a concave grating with facets lying on a curved (eg. Rowland circle) geometry then shadowing effects will result in non-uniform and uncontrolled metal coverage leading to problems with reproducibility and wavelength dependent PDL. In contrast, the method according to FIG. 11 allows the creation of reflective facets 570, which are fully metallized, using standard microfabrication steps. Therefore, low PDL is more reproducibly achievable with suitable control using the method steps of FIG. 11.

In some embodiments of the invention, un-coated regions of reflective facets forming gaps have surfaces intermediate between the metal coating and the non-reflective facet.

Numerous modifications and variations of the present invention are possible in light of the above teachings. It is therefore to be understood that within the scope of the appended claims, the invention may be practised otherwise than as specifically described herein.

The invention claimed is:

1. A diffraction grating comprising a plurality of grooves formed in an optical substrate with each groove having:
    a) a reflective facet having at least one coated region coated with electrically conducting material and at least one uncoated region not coated with electrically conducting material;
    b) at least one sidewall to the reflective facet, the sidewall not coated with electrically conductive material.

2. The diffraction grating according to claim 1 wherein:
    in each reflective facet, said at least one coated region comprises a single coated region, and said at least one uncoated region comprises two uncoated regions on either side of the single coated region.

3. The diffraction grating according to claim 1 wherein the optical substrate comprises at least one layer of high refractive index surrounded on both sides by media of lower refractive index, the plane of said optical substrate perpendicular to the reflective facet.

4. The diffraction grating according to claim 1, wherein the plurality of reflective facets are embedded within the optical substrate.

5. The diffraction grating according to claim 4 wherein groove-filling material with a refractive index similar to that of the optical substrate is deposited in spaces in each groove adjoining said reflective facet and said at least one sidewall.

6. The diffraction grating according to claim 5 wherein the groove-filling material is a single material matched in index to the effective index of the optical substrate.

7. The diffraction grating according to claim 1, wherein the reflective facets form a stepped arrangement.

8. The diffraction grating according to claim 1, wherein groove-filling material with a refractive index similar to that of the optical substrate is applied in spaces in each groove adjoining said facet and said at least one sidewall rendering said sidewall effectively invisible.

9. The diffraction grating according to claim 8 wherein the reflective facets reflect the totality of light incident to the grating.

10. The diffraction grating according to claim 8 wherein the reflective facets reflect a substantial fraction of incident light, with light allowed to escape around the edges of the reflecting portions.

11. The diffraction grating according to claim 8 wherein the optical substrate comprises at least one layer of high refractive index surrounded by media of lower refractive index and the groove-filling material has a layer structure and indices similar to the respective layers of the optical substrate.

12. The diffraction grating according to claim 8 wherein the groove-filling material is a single material matched in index to the effective index of the optical substrate.

13. The diffraction grating according to claim 8 wherein the groove-filling material is an optical material that is transparent to light of a pre-determined wavelength.

14. The diffraction grating according to claim 1 wherein in each reflective facet, said at least one uncoated region comprises surfaces intermediate between the coated region of the reflective facet and the sidewalls, connecting the reflective facet to the sidewalls.

15. The diffraction grating according to claim 1 wherein each sidewall is transverse the reflective facet.

16. A diffraction grating comprising a plurality of reflective facets embedded within an optical substrate wherein the optical substrate comprises a plurality of grooves with each groove having a surface which serves as a reflective facet and also having a sidewall, with groove-filling material with refractive index similar to that of the optical substrate deposited in spaces adjoining the facets and sidewalls, wherein the optical substrate comprises at least one layer of high refractive index surrounded by media of lower refractive index, the plane of said optical substrate perpendicular to the reflective facets.

17. The diffraction grating according to claim 16 wherein the groove-filling material has a layer structure and indices similar to the respective layers of the optical substrate.

18. A diffraction grating comprising a plurality of grooves in an optical substrate with each groove having a surface which serves as a reflective facet, and having effectively no sidewalls between the facets, said sidewalls being rendered effectively invisible by the application of material with a refractive index similar to that of the substrate, the application being in the spaces adjoining both the facets and the sidewalls wherein the reflective facets reflect a substantial fraction of incident light, with light allowed to escape through small gaps within the otherwise reflecting portions.

19. A diffraction grating comprising a plurality of grooves in an optical substrate with each groove having a surface which serves as a reflective facet, and having effectively no sidewalls between the facets, said sidewalls being rendered effectively invisible by the application of material with a refractive index similar to that of the substrate, the application being in the spaces adjoining both the facets and the sidewalls wherein the optical substrate comprises at least one layer of high refractive index surrounded by media of lower refractive index, the plane of said optical substrate being perpendicular to the reflective facet.

* * * * *

UNITED STATES PATENT AND TRADEMARK OFFICE
CERTIFICATE OF CORRECTION

PATENT NO.         : 7,420,734 B2                                    Page 1 of 1
APPLICATION NO. : 10/526096
DATED              : September 2, 2008
INVENTOR(S)        : Balakrishnan et al.

It is certified that error appears in the above-identified patent and that said Letters Patent is hereby corrected as shown below:

On the Title Page of the patent, Item (75), Inventors:

"Muthukumaran Packirisamy, Dorvai (CA)"

should read

-- Muthukumaran Packirisamy, Dorval (CA) --.

Signed and Sealed this

First Day of December, 2009

David J. Kappos
*Director of the United States Patent and Trademark Office*